US008434831B2

(12) United States Patent  (10) Patent No.: US 8,434,831 B2
Yang  (45) Date of Patent: May 7, 2013

(54) VEHICLE BRAKE DEVICE FOR ELECTRONIC HYDRAULIC BRAKE SYSTEM

(75) Inventor: I Jin Yang, Gyeonggi-do (KR)

(73) Assignee: Mando Corporation, Pyeongtaek-si (KR)

(*) Notice: Subject to any disclaimer, the term of this patent is extended or adjusted under 35 U.S.C. 154(b) by 603 days.

(21) Appl. No.: 12/351,130

(22) Filed: Jan. 9, 2009

(65) Prior Publication Data
US 2009/0179485 A1 Jul. 16, 2009

(30) Foreign Application Priority Data
Jan. 10, 2008 (KR) .................. 10-2008-0002990

(51) Int. Cl.
 *B60T 8/34* (2006.01)
 *B60T 13/18* (2006.01)
(52) U.S. Cl.
 USPC .................. 303/113.4; 303/115.1; 60/576
(58) Field of Classification Search ............... 303/11, 303/113.3, 113.4, 114.1, 115.1; 60/547.1, 60/550, 554, 576; 188/358
See application file for complete search history.

(56) References Cited

U.S. PATENT DOCUMENTS

| | | | | |
|---|---|---|---|---|
| 5,044,700 A | * | 9/1991 | Willmann | 303/113.4 |
| 5,531,509 A | * | 7/1996 | Kellner et al. | 303/114.1 |
| 6,966,615 B2 | * | 11/2005 | Kusano et al. | 303/114.1 |
| 7,083,240 B2 | * | 8/2006 | Matsuno et al. | 303/114.1 |
| 2004/0227396 A1 | * | 11/2004 | Kusano | 303/113.1 |
| 2008/0236971 A1 | * | 10/2008 | Suzuki et al. | 188/358 |
| 2008/0258545 A1 | * | 10/2008 | Drumm | 303/114.1 |

FOREIGN PATENT DOCUMENTS

| | | |
|---|---|---|
| DE | 102 58 266 A1 | 7/2004 |
| DE | 103 06 058 A1 | 8/2004 |
| DE | 103 06 059 A1 | 8/2004 |
| DE | 10 2004 054 780 B4 | 8/2007 |

OTHER PUBLICATIONS

Machine Translation of DE-10306059.*
Human English translation of DE-10306059.*

* cited by examiner

*Primary Examiner* — Melody Burch
(74) *Attorney, Agent, or Firm* — McDermott Will & Emery LLP

(57) ABSTRACT

A vehicle brake device includes an input shaft coupled to a brake pedal, a pedal operation detector, a pedal simulator coupled to the input shaft in a control housing, a master cylinder, a control piston, a control chamber, and a hydraulic pressure supply, wherein the pedal simulator includes a pedal simulator piston, a pressing member, a simulator piston provided in the pedal simulator piston, and a push rod which is accommodated in the pressing member while being spaced apart from a bottom wall of a guide groove by passing through the pedal simulator piston and the simulator piston from the control piston to the input shaft, and wherein a diameter of the master cylinder is greater than a diameter of the simulator piston, and a diameter of the control piston is greater than a diameter of the master cylinder.

9 Claims, 4 Drawing Sheets

VEHICLE BRAKE DEVICE FOR
ELECTRONIC HYDRAULIC BRAKE SYSTEM

CROSS-REFERENCE TO RELATED
APPLICATION

This application claims the benefit of Korean Patent Application No. 10-2008-0002990 filed on Jan. 10, 2008, in the Korean Intellectual Property Office, the disclosure of which is incorporated herein by reference.

BACKGROUND OF THE INVENTION

1. Field of the Invention

The present invention relates to a vehicle brake device for an electronic hydraulic brake (EHB) system. More particularly, the present invention relates to a vehicle brake device an electronic hydraulic brake (EHB) system, capable of quickly forming a braking pressure according to pedal force of a driver in an abnormal operation mode of an EHB system, and suitable for generating a greater braking pressure under the same pedal force.

2. Description of the Related Art

In general, if a driver steps on a brake pedal in a normal operation mode, an electronic hydraulic brake (EHB) system detects the displacement of the brake pedal by a displacement sensor to close a cut-off valve, thereby cutting off passages between a master cylinder of a pedal simulator and wheels. Then, an electronic control unit (ECU) calculates a wheel pressure based on a pressure signal transmitted from a pressure sensor to feed-back control a pressure of each wheel by adjusting a pressure of an accumulator, which stores a pressurized liquid generated from a motor pump, using solenoid valves provided in an intake port and an exhaust port of the wheel. When the EHB detects that the driver wants to perform the braking operation, the EHB supplies pedal repulsive force. To this end, as shown in FIG. 1, the EHB system includes a master cylinder 10 and a simulator 40 equipped with a simulation piston 41 and a simulation spring 42 elastically supporting the simulation piston 41 through an opening 13.

In the master cylinder 10 including the simulator 40, if the driver steps on the brake pedal in a normal operation mode, a pressure applied to the brake pedal is delivered to the master cylinder 10 through a first piston 20, and then delivered to a second piston 30 by a first spring 22 supporting the first piston 20. At this time, passages between first and second chambers 21 and 31 and a wheel cylinder (not shown) are blocked by a normally open (NO) valve so that a brake fluid is stagnated, and the first and second pistons 20 and 30 do not move forward. If the driver keeps on stepping on the brake pedal, the first piston 20 moves forward while compressing the first spring 22, and the brake fluid of the first chamber 21 flows into a simulation chamber 43 through a passage between a bore-type step difference part 11 and a sealing element 36. In this case, a pressure is formed in the simulation chamber 43 and the first chamber 21 due to elastic force of the simulation spring 42, so that the driver feels the braking force.

In an abnormal operation mode of the EHB system, since the cut-off valve is in a normally open (NO) state, the brake fluid of the first and second chambers 21 and 31 of the master cylinder 10 flows into the wheel cylinder when the driver steps on the brake pedal. As the brake fluid of the second chamber 31 flows into the wheel cylinder, the second piston 30 moves forward. If the second piston 30 moves forward beyond a fluid passage 12 formed in the bore-type step difference part 11, the passage between the first and second chambers 21 and 31 is blocked by the second piston 30, so that the master cylinder operates similarly to the master cylinder applied to a conventional brake. Accordingly, the braking operation can be achieved by the pressure applied to the brake pedal.

However, according to the braking device of the EHB system, in the abnormal operation mode, it takes a long time to block the fluid introduced into the simulation piston by using the piston which is moved forward in the master cylinder as the pressure is applied to the brake pedal by the driver. That is, it takes a long time to form the braking pressure by the pedal force of the driver, so that, the EHB system cannot quickly form the braking pressure.

SUMMARY OF THE INVENTION

Accordingly it is an aspect of the present invention to provide a vehicle brake device of an electronic hydraulic brake system, capable of completely separating an input shaft of a pedal from a piston of a master cylinder in a normal operation mode, and quickly forming a great braking pressure with less pedal force in an abnormal operation mode.

Additional aspects and/or advantages of the invention will be set forth in part in the description which follows and, in part, will be apparent from the description, or may be learned by practice of the invention.

The foregoing and/or other aspects of the present invention are achieved by providing a vehicle brake device of an electronic hydraulic brake system including an input shaft coupled to a brake pedal, a pedal operation detector which detects pedal force of a driver, a pedal simulator coupled to the input shaft in a control housing to supply pedal repulsive force, a master cylinder which delivers a hydraulic pressure to a wheel brake when a braking pressure is formed by the brake pedal, a control piston which is adjacent to a first piston of the master cylinder to deliver a hydraulic pressure to the first piston, a control chamber which controls a pressure of the master cylinder between the control piston and the pedal simulator, and a hydraulic pressure supply which delivers a hydraulic pressure to the control chamber as required by a driver. The pedal simulator includes a pedal simulator piston which slidably moves in the control housing, a pressing member which reciprocates corresponding to reciprocating motion of the input shaft in the pedal simulator piston, a simulator piston provided in the pedal simulator piston to slidably move corresponding to movement of the pressing member, and a push rod which is accommodated in the pressing member while being spaced apart from a bottom wall of a guide groove by passing through the pedal simulator piston and the simulator piston from the control piston to the input shaft such that the input shaft is mechanically separated from the first piston in a normal operation mode. A diameter of the master cylinder is greater than a diameter of the simulator piston, and a diameter of the control piston is greater than a diameter of the master cylinder.

According to an aspect of the present invention, the pedal simulator further includes a second simulator spring provided between the simulator piston and the pressing member to deliver operational force of the pressing member to the simulator piston, and a first simulator spring which elastically supports the simulator piston between the simulator piston and an inner wall of the pedal simulator piston, in which a spring constant of the first simulator spring is smaller than a spring constant of the second simulator spring.

According to an aspect of the present invention, the push rod coupled to the control piston is separated from the input shaft in the normal operation mode, and pedal force is formed by the pedal simulator.

According to an aspect of the present invention, the pedal simulator piston moves toward the input shaft by a pressure of the control chamber in the normal operation mode, and movement of the pedal simulator piston is restricted by a locking step provided in the control housing.

According to an aspect of the present invention, the input shaft is coupled to the control piston through the push rod after the input shaft has been moved by a predetermined displacement in an abnormal operation mode.

As described above, a vehicle brake device of an electronic hydraulic brake system according to the present invention can completely separate an input shaft coupled with a brake pedal from a first piston of a master cylinder in a normal operation mode, and quickly form a great braking pressure with less pedal force in an abnormal operation mode.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
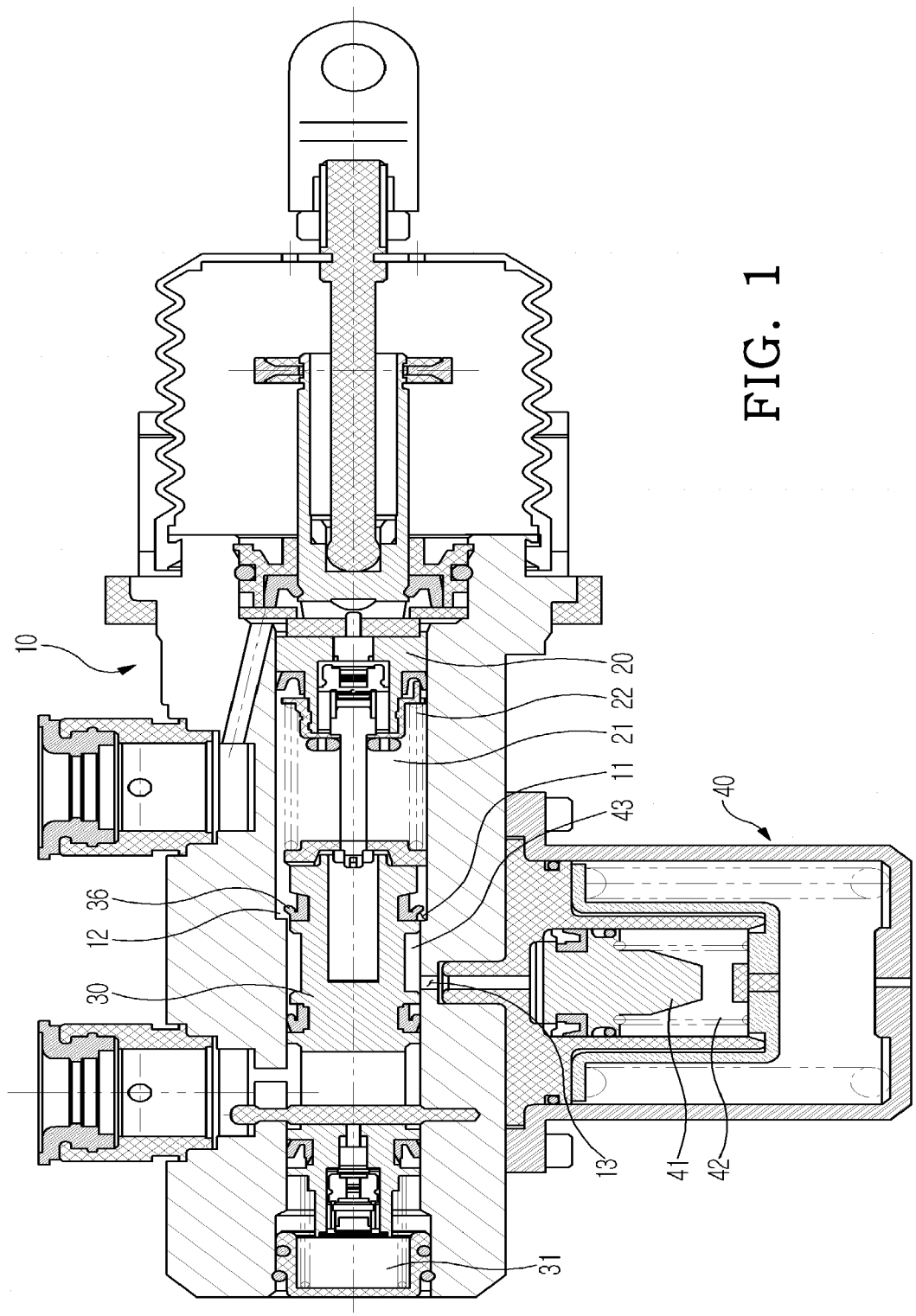
FIG. 1 is a sectional view showing a master cylinder equipped with a conventional pedal simulator.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, a preferred embodiment of a vehicle brake device for an electronic hydraulic brake (EHB) system according to the present invention will be described with reference to accompanying drawings.

Figure 2:
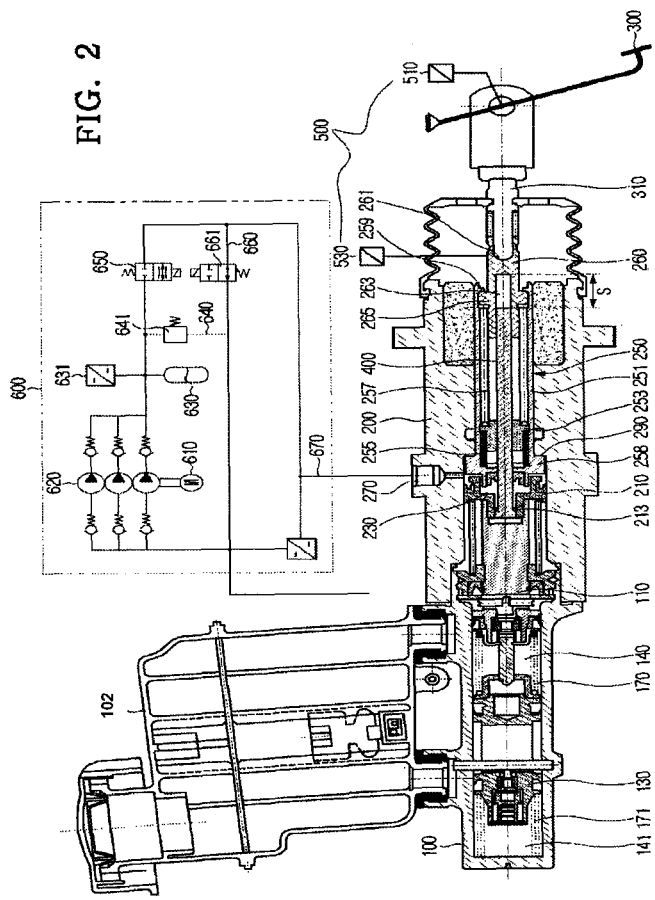
FIG. 2 is a sectional view showing a hydraulic pressure supply and a vehicle brake device of an electronic hydraulic brake system according to the present invention.

As shown in FIG. 2, the vehicle brake device for the electronic hydraulic brake (EHB) system according to the present invention includes an input shaft 310, a pedal operation detector 500, a pedal simulator 250, a master cylinder 100, a reservoir 102, a control piston 210, a control chamber 230, a hydraulic pressure supply 600, and an anti-lock brake system (ABS) hydraulic pressure part 700. The input shaft 310 is coupled to a brake pedal 300 manipulated by a driver in braking, and the pedal operation detector 500 includes a pedal displacement sensor 510 or a stroke sensor 530 to detect the pedal force of the driver. The pedal simulator 250 is coupled to the input shaft 310 in a control housing 200 to supply pedal repulsive force, and the master cylinder 100 delivers a hydraulic pressure to a wheel brake 800 when a braking pressure is formed by the brake pedal 300. The reservoir 102 is provided at an upper portion of the master cylinder 100 to store oil, and the control piston 210 delivers the hydraulic pressure to a first piston 110 of the master cylinder 100. The control chamber 230 controls the pressure of the master cylinder 100 between the control piston 210 and the pedal simulator 250, and the hydraulic pressure supply 600 delivers a hydraulic pressure corresponding to the braking intention of the driver to the control chamber 230. The anti-lock brake system (ABS) hydraulic pressure part 700 is provided between the master cylinder 100 and the wheel brake 800 to form various passages, and includes a plurality of valves, pumps, and accumulators.

The input shaft 310 coupled to the brake pedal 300 is accommodated in a pressing member 260 that is movably provided in a pedal simulator piston 251 in an axial direction. In addition, the pedal displacement sensor 510 is provided on the brake pedal 300 in order to detect the braking intention of the driver.

The pressing member 260 is provided at one side thereof with a receiving groove 261 to receive the input shaft 310, and provided at the other side thereof with a guide groove 263 allowing a push rod 400 to slidably move, so that the pressing member 260 extends into the pedal simulator piston 251. A protrusion part 265 radially protrudes from an outer circumference of the pressing member 260. In addition, the stroke sensor 530 is provided in the pressing member 260.

A simulator piston 253 is provided in the pedal simulator piston 251 to slidably move in an axial direction with the movement of the pressing member 260. A second simulator spring 257 is provided between the simulator piston 253 and the pressing member 260 to deliver the operational force of the pressing member 260 to the simulator piston 253, and a first simulator spring 255 is provided between the simulator piston 253 and an inner wall of the pedal simulator piston 251 to elastically support the simulator piston 253. In addition, the first simulator spring 255 has a spring constant smaller than that of the second simulator spring 257. In this case, when the pressing member 260 moves forward by the input shaft 310 coupled to the brake pedal 300, the first simulator spring 255, which elastically supports the simulator piston 253, is compressed against the inner wall of the pedal simulator piston 251 thereby forming primary repulsive force, and when the first simulator spring 255 is fully compressed, the pressing member 260 pushes the second simulator spring 257 to compress the second simulator spring 257 toward the control piston 210, thereby forming secondary repulsive force. Thus, suitable steeping force is generated due to the two linear repulsive forces.

The pedal simulator piston 251 includes a flange radially protruding outward from the end of the pedal simulator piston 251 so that the backward-movement of the flange is restricted by a locking step 290 provided in the control housing 200. The pedal simulator piston 251 includes a stopper step 259 radially protruding inward from the other end of the pedal simulator piston 251 to prevent the pressing member 260 from moving rearward of the pedal simulator piston 251.

The master cylinder 100 includes the first piston 110, a second piston 130, a first chamber 140, a first spring 170, a second chamber 141, and a second spring 171. The first piston 110 delivers a pressure of a pedal pressed by the driver to the master cylinder 100, and the second piston 130 moves forward by a forwarding operation of the first piston 110. The first chamber 140 is provided to compress oil between the first and second pistons 110 and 130. The first spring 170 is installed between the first and second pistons 110 and 130 to deliver the operational force of the first piston 110 to the second piston 130. The second chamber compresses oil between the second piston 130 and an inner wall of the master cylinder 100. The second spring 171 is installed between the second piston 130 and the inner wall of the master cylinder 100 to elastically support the second piston 130. In addition, first and second ports 150 and 151 are provided at a lower portion of the master cylinder 100 in order to deliver an internal liquid pressure of the master cylinder 100 to the wheel brake 800.

In addition, an internal diameter of the master cylinder 100 is greater than a diameter of the simulator piston 253.

The control housing 200 has an oil hole 270 provided between the first piston 110 and the pedal simulator piston 251 to supply a braking fluid, which has been stored in an accumulator 630, in a normal operation mode.

The control piston 210 is adjacent to the first piston 110 to deliver the liquid pressure of oil introduced through the oil hole 270 to the first piston 110. The control piston 210 slidably moves in an axial direction in the control housing 200, and is elastically supported by a support spring. In addition, the diameter of the control piston 210 is greater than an internal diameter of the master cylinder 100.

In addition, a push rod 400 is fixedly installed in the control piston 210 to form a liquid pressure through a mechanical contact between the first piston 110 and the input shaft 310 in the abnormal operation mode.

The push rod 400 extends by passing through the pedal simulator piston 251 and the simulator piston 253 such that a predetermined free space S can be formed between a free end of the push rod 400 and the guide groove 263 of the pressing member 260. In addition, although the movement of the push rod 400 toward the input shaft 310 is restricted by the control piston 210 and a protrusion part 213, the push rod 400 is not restricted by the pedal simulator piston 251 and the simulator piston 253, through which the push rod 400 passes, but can freely move.

The control chamber 230 is provided between the control piston 210 and the pedal simulator piston 251 to control the pressure of the master cylinder 100.

The hydraulic pressure supply 600 supplying a braking hydraulic pressure to the control chamber 230 includes a pump 620 operated by a motor 610. The motor 610 is controlled by an electronic control unit (ECU). In other words, the ECU controls the motor 610 by a baking pressure corresponding to the braking intention of the driver according to pedal stroke or pedal force based on pedal manipulation detection and a pedal manipulation signal of the stroke sensor 530 or the pedal displacement sensor 510.

The hydraulic pressure supply 600 includes the accumulator 630 provided between an inlet valve 650 and an output port of the pump 620 to temporarily store high-pressure oil obtained through the driving of the pump 620. A pressure sensor 631 is provided at an output port of the accumulator 630 to measure an oil pressure of the accumulator 630. Accordingly, the oil pressure measured by the pressure sensor 631 is compared with a preset pressure. If the oil pressure is lower than the preset pressure, the pump 620 is driven to fill an oil pressure in the accumulator 630.

In addition, the hydraulic pressure supply 600 is provided therein with a relief passage 640 connecting the output port of the accumulator 630 and an output port of an outlet valve 661, which is described later, in order to prevent an excessive pressure from being filled in the accumulator 630, and a relief valve 641 is provided at the relief passage 640. In detail, the relief valve 641 is maintained at a closed state in ordinary times, and is open if the oil pressure of the accumulator 630 exceeds the preset pressure, thereby preventing an excessive pressure from being generated in the accumulator 630.

The inlet valve 650 is provided at the output port of the accumulator 630. The inlet valve 650 is a normally close type, and open if a driver steps on the brake pedal, thereby delivering braking oil stored in the accumulator 630 to the control chamber 230.

In addition, a return passage 660 is provided in the hydraulic pressure supply 600 to connect the control chamber 230 with an input port of the pump 620, and the outlet valve 661 is provided in the middle of the return passage 660 to discharge oil of the control chamber 230 to the input port of the pump 620.

The hydraulic pressure supply 600 is coupled to the oil hole 270 through a hydraulic pressure line 670 to allow oil to be input/output to the control chamber 230.

Figure 3:
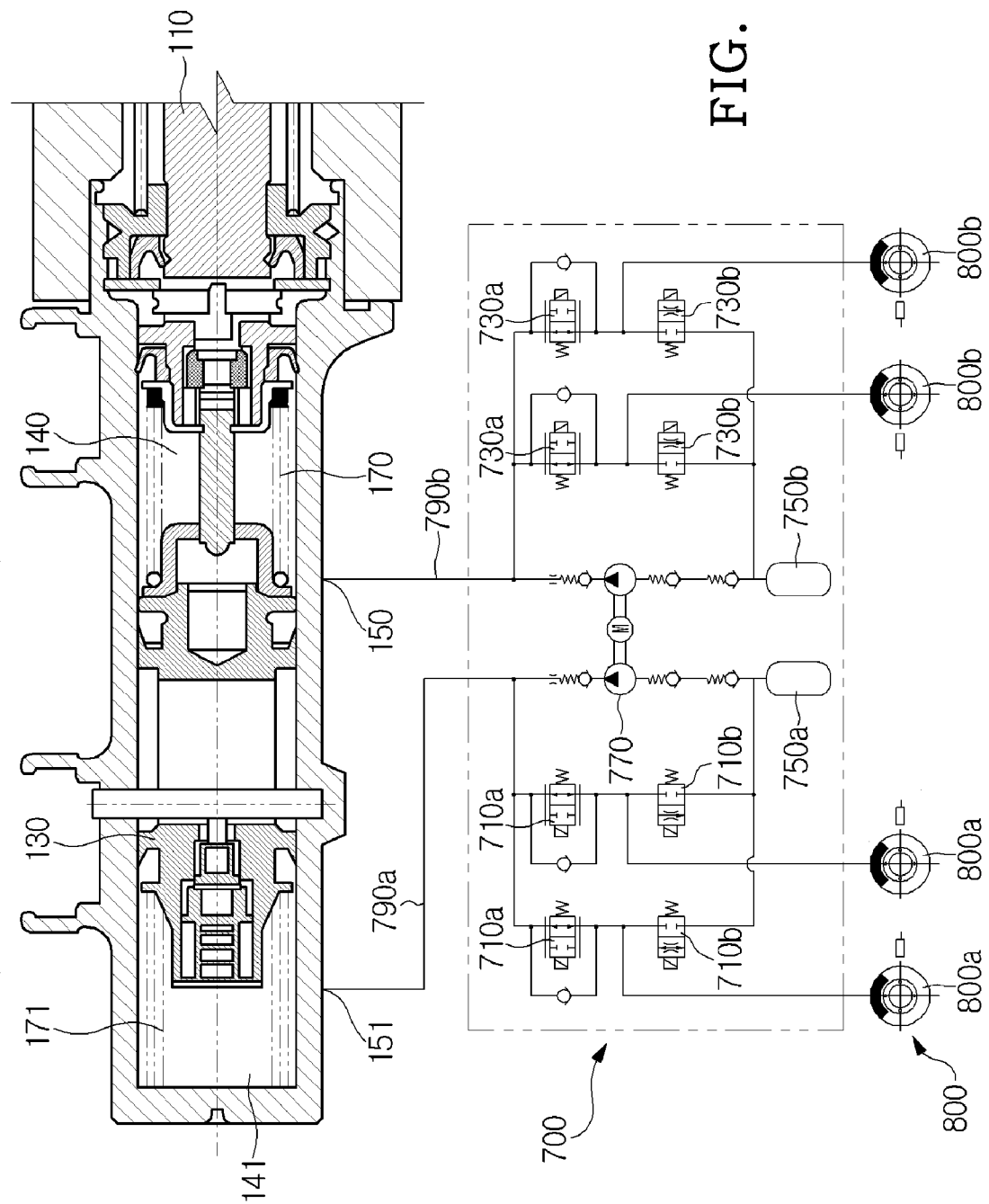
FIG. 3 is a sectional view showing an ABS hydraulic pressure part and the vehicle brake device of the electronic hydraulic brake system according to the present invention.

FIG. 3 is a schematic view showing the ABS hydraulic pressure part 700 according to the present invention. The ABS hydraulic pressure part 700 includes a plurality of solenoid valves 710a, 710b, 730a, and 730b, first and second low-pressure accumulators 750a and 750b, a pump 770, and first and second oil passages 790a and 790b. The solenoid valves 710a, 710b, 730a, and 730b control braking hydraulic pressures delivered to first and second wheel brakes 800a and 800b. The first and second low-pressure accumulators 750a and 750b temporarily store oil from the first and second wheel brakes 800a and 800b in a pressure reduction mode of an ABS. The pump 770 sucks and discharges oil stored in the first and second low-pressure accumulators 750a and 750b. The first and second oil passages 790a and 790b connect the first and second ports 150 and 151 of the master cylinder 100 with inlets of the pump 770. The solenoid valves are classified into NO-type solenoid valves 710a and 730a provided at an upstream part of the first and second wheel brakes 800a and 800b and NC-type solenoid valves 710b and 730b provided at a downstream part of the first and second wheel brakes 800a and 800b. The ECU (not shown) controls an open/close operation of the solenoid valves 710a, 710b, 730a, and 730b according to a vehicle speed.

Hereinafter, the operation of the vehicle brake device of the electronic hydraulic brake system according to an embodiment of the present invention will be described.

Referring to FIG. 2, in the normal operation mode of the EHB system, if a driver steps on a brake pedal, the input shaft 310 coupled to the brake pedal 300 moves to the left in the axial direction. Simultaneously, the pressing member 260 moves to the left in the pedal simulator piston 251. The movement of the pressing member 260 is detected by the stroke sensor 530, and a detection signal for the movement of the pressing member 260 is transmitted to the ECU. Accordingly, the ECU drives the motor 610 to operate the pump 620 in order to create a braking hydraulic pressure. High-pressure oil created by the pump 620 is stored in the accumulator 630. In other words, the hydraulic pressure supply 600 detects the braking intension of the driver by the pedal displacement sensor 510 or the stroke sensor 530 and transmits a detection signal to the ECU, and the ECU delivers a hydraulic pressure corresponding to the braking intention from the accumulator 630, which has stored oil pressurized by the pump 620, to the control chamber 230 through the hydraulic pressure line 670 by opening the inlet valve 650.

Referring to FIG. 2, the braking fluid introduced into the control chamber 230 is applied to the control piston 210 located at a left portion of the control chamber 230 and to the pedal simulator piston 251 located at a right portion of the control chamber 230. However, since the pedal simulator piston 251 is supported by the locking step 290 provided in the control housing 200, the movement of the pedal simulator piston 251 in a right direction is restricted. In addition, the control piston 210 moves left by the hydraulic pressure of the control chamber 230 to deliver the hydraulic pressure to the first piston 110 adjacent to the control piston 210. In addition, the first piston 110 moves forward in the left direction, so that the second piston 130 moves forward. Accordingly, oil is compressed by the first and second chambers 140 and 141, and then introduced into the ABS hydraulic pressure part 700 through the first and second ports 150 and 151.

In addition, although the pressing member 260 moves forward in the left direction as the input shaft 310 moves forward in the left direction, the push rod 400 coupled to the control piston 210 moves left with the control piston 210 as the control piston 210 moves left. Accordingly, the push rod 400 is separated from the input shaft 310, so that force delivered to the pressing member 260 through the input shaft 310 is not transferred to the first piston 110. In other words, since a left movement degree of the control piston 210 is greater than a left movement degree of the input shaft 310 and the pressing member 260, one side of the push rod 400 is not accommodated in the guide groove 263 of the pressing member 260 beyond the free space S in the normal operation mode. Accordingly, force applied in the axial direction by the input shaft 310 coupled to the brake pedal 300 is not delivered to the first piston 110 due to the free space S.

When the movement of the pedal simulator piston 251 in the right direction is restricted due to the hydraulic pressure of the control chamber 230 and the locking step 290, and the driver steps on the brake pedal 300, if the pressing member 260 moves forward by the input shaft 310 coupled with the brake pedal 300, the second simulator spring 257, which elastically supports the simulator piston 253, is compressed toward the simulator piston 253 to form primary repulsive force in a direction opposite to a forwarding direction of the input shaft 310. In addition, when the second simulator spring 257 is completely compressed, the simulator piston 253 pushes the first simulator spring 255. Accordingly, the second simulator spring 257 is compressed in the forwarding direction of the pressing member 260 to form secondary repulsive force. Therefore, linear repulsive force is formed twice, so that a driver can feel suitable stepping force on the disk pedal.

In an abnormal operation mode of the EHB system, although the braking hydraulic pressure is not applied to the control chamber 230, the input shaft 310 and the pressing member 260 move forward in the left direction with the operation of the brake pedal 300. Accordingly, the first simulator spring 255 is compressed in the forwarding direction. After the first simulator spring 255 is completely compressed to closely make contact with the pedal simulator piston 251, the second simulator spring 257 is compressed. Accordingly, the pedal simulator piston 251 closely makes contact with the control piston 210 while pressing the control chamber 230. In addition, one side of the push rod 400 accommodated in the guide groove 263 of the pressing member 260 slides into the free space S to approach the inner wall of the guide groove 263 and the other side of the push rod 400 locked with the control piston 210 approaches to the first piston 110. Accordingly, the push rod 400 is coupled with the input shaft 310 and the first piston 110. Therefore, as the first piston 110 moves forward in the left direction, the second piston 130 moves forward, so that oil of the first and second chambers 140 and 141 is compressed. Then, the oil is introduced into the ABS hydraulic pressure part 700 through the first and second ports 150 and 151 and delivered to the wheel brake 800. Accordingly, a brake pressure can be quickly formed.

Figure 4:
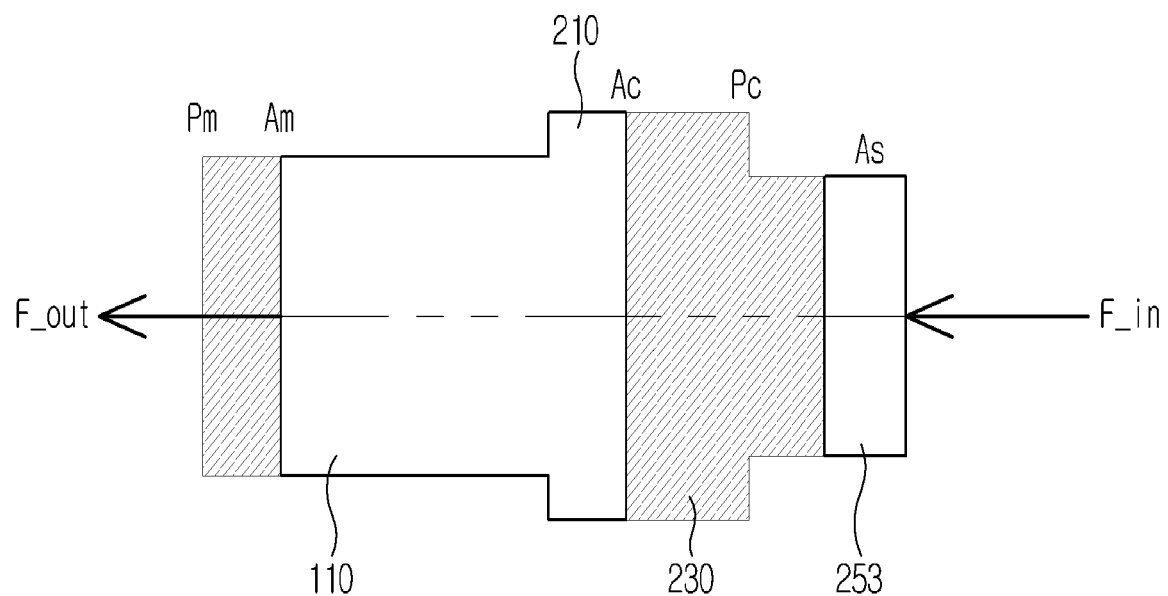
FIG. 4 is a view showing a structure in which a pressure is amplified in an abnormal operation mode of the electronic hydraulic brake system according to the present invention.

Referring to FIG. 4, in such an abnormal operation mode, since a diameter of the control piston 210 is greater than a diameter of the master cylinder 100, and the diameter of the master cylinder 100 is greater than the diameter of the simulator piston 253, a baking pressure is increased even if the pedal force is not increased. Accordingly, the safety of the driver can be ensured more advantageously. In other words, as the driver steps on the brake pedal 300 with predetermined pedal force F_in, a pressure Pc between the simulator piston 253 and an end of the inner wall of the pedal simulator piston 251 is applied to the control piston 210, and the control piston 210 delivers force F_out to the inside of the master cylinder 100 through the first piston 110. Accordingly, the force F_out exerted on the control piston 210 is identical to the force F_out exerted on the inside of the master cylinder 100. In other words, the pressure Pc in the control chamber 230 is expressed in the following equation.

$$Pc = \frac{F\_in}{A_s} = \frac{F\_out}{A_c}$$

Accordingly, the force F_out exerted in the master cylinder 100 is proportional to a sectional area Ac of the control piston 210, and inversely proportional to a sectional area As of the simulator piston 253. This is expressed in the following equation.

$$F\_out = \frac{Ac}{As} \times F\_in$$

Accordingly, the pressure Pm of oil delivered to the wheel brake 800 through the master cylinder 100 is expressed in the following equation.

$$Pm = \frac{F\_out}{Am} = \frac{F\_in}{Am} \times \frac{Ac}{As}$$

In other words, the sectional area Am of the master cylinder 100 is a variable determined according to specification of a vehicle, such as an amount of oil required for a braking operation. On the assumption that the same vehicle type is employed under the same pedal force F, although the pressure Pm of oil delivered to the wheel brake 800 through the master cylinder 100 is proportional to the sectional area Ac of the control piston 210, the pressure Pm is inversely proportional to the sectional area As of the simulator piston 253.

Therefore, according to the present invention, since the diameter of the control piston 210 is greater than the diameter of the simulator piston 253, the braking pressure is increased under the same pedal force. Accordingly, a great braking pressure can be formed even under small pedal force.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A vehicle brake device of an electronic hydraulic brake system comprising:
    an input shaft coupled to a brake pedal;
    a pedal operation detector which detects pedal force of a driver;
    a pedal simulator coupled to the input shaft in a control housing to supply pedal repulsive force;

a master cylinder which delivers a hydraulic pressure to a wheel brake when a braking pressure is formed by the brake pedal;
a control piston which is adjacent to a first piston of the master cylinder to deliver a hydraulic pressure to the first piston;
a control chamber which controls a pressure of the master cylinder between the control piston and the pedal simulator; and
a hydraulic pressure supply which delivers a hydraulic pressure to the control chamber as required by a driver,
wherein the pedal simulator includes:
a first simulator piston which slidably moves in the control housing;
a pressing member which reciprocates corresponding to reciprocating motion of the input shaft in the first simulator piston;
a second simulator piston provided in the first simulator piston to slidably move corresponding to movement of the pressing member; and
a push rod which is accommodated in the pressing member while being spaced apart from a bottom wall of a guide groove of the pressing member by passing through the first simulator piston and the second simulator piston from the control piston to the input shaft such that the input shaft is mechanically separated from the first piston of the master cylinder in a normal operation mode, said push rod and pressing member are arranged to slidably move relative to each other on corresponding surfaces thereof,
wherein a diameter of the master cylinder is greater than a diameter of the second simulator piston, and a diameter of the control piston is greater than the diameter of the master cylinder, and
the second simulator piston is arranged to slidably move on a surface of the push rod.

2. The vehicle brake device of claim 1, wherein the pedal simulator further comprises:

a first simulator spring which elastically supports the second simulator piston between the second simulator piston and an inner wall of the first simulator piston; and
a second simulator spring provided between the second simulator piston and the pressing member to deliver operational force of the pressing member to the second simulator piston,
wherein a spring constant of the first simulator spring is smaller than a spring constant of the second simulator spring.

3. The vehicle brake device of claim 1, wherein the push rod coupled to the control piston is separated from the input shaft in the normal operation mode, and pedal force is formed by the pedal simulator.

4. The vehicle brake device of claim 1, wherein the first simulator piston moves toward the input shaft by a pressure of the control chamber in the normal operation mode, and movement of the first simulator piston is restricted by a locking step provided in the control housing.

5. The vehicle brake device of claim 1, wherein the input shaft is coupled to the control piston through the push rod after the input shaft has been moved by a predetermined displacement in an abnormal operation mode.

6. The vehicle brake device of claim 1, wherein the push rod passes through an opening formed in the second simulator piston.

7. The vehicle brake device of claim 1, wherein a free space is formed between a free end of the push rod and the bottom wall of the guide groove so that the push rod and the input shaft are mechanically coupled selectively.

8. The vehicle brake device of claim 7, wherein said push rod and said pressing member slidably move relative to each other within said free space.

9. The vehicle brake device of claim 7, wherein another end of the push rod is fixedly coupled to the control piston.

* * * * *